United States Patent
Bradley

(10) Patent No.: US 6,944,989 B1
(45) Date of Patent: Sep. 20, 2005

(54) SYSTEM AND KIT OF COMPONENTS FOR WINTERIZING TREES

(75) Inventor: John Bradley, Panama City Beach, FL (US)

(73) Assignee: William W. Bradley, Wheaton, IL (US), Trustee ( * ) Notice: Subject to any disclaimer, the term of this patent is extended or adjusted under 35 U.S.C. 154(b) by 0 days.

(21) Appl. No.: 10/839,912

(22) Filed: May 7, 2004

Related U.S. Application Data

(60) Provisional application No. 60/469,218, filed on May 12, 2003.

(51) Int. Cl.⁷ ................ A01G 13/10; A01G 13/02; A01G 13/04; A01G 9/12; A01G 9/16

(52) U.S. Cl. ............. 47/45; 47/44; 47/2; 47/20.1; 47/29.1; 47/23.1; 47/29.5; 47/32.4; 52/63; 52/146; 52/19; 52/653.2; 285/121.1; 285/121.4; 285/133.11; 285/21.1; 285/915; 285/423; 403/295; 403/297; 403/293; 256/1; 256/25; 256/26; 256/65.01; 256/67; 256/65.03; 256/65.04; 256/65.05

(58) Field of Search ............. 47/2, 70, 44, 45, 47/47, 60, 20.1, 30, 29.1, 22.1, 23.1, 23.3, 47/24.1, 29.2, 29.3, 29.5, 29.6, 32.4, 32.5, 47/19.1; 119/497, 499, 487, 514, 524, 502, 119/512, 60, 58; 52/63, 146, 19, 653.2; 285/121.1, 285/121.4

(56) References Cited

U.S. PATENT DOCUMENTS

| | | | |
|---|---|---|---|
| 199,353 A * | 1/1878 | Clark | |
| 696,520 A * | 4/1902 | Valkenburg | 256/35 |
| 831,714 A * | 9/1906 | Follett | 52/146 |
| 876,248 A * | 1/1908 | Tiedeman | 52/146 |
| 951,807 A * | 3/1910 | Erdly | |
| 989,341 A | 4/1911 | Dixon | |
| 1,176,983 A * | 3/1916 | Phillips | 52/146 |
| 1,416,575 A * | 5/1922 | Plaut | |
| 1,840,561 A * | 6/1932 | Miller | |
| 2,009,867 A * | 7/1935 | Ball | |
| 2,014,175 A | 9/1935 | Hart | |
| 3,206,892 A * | 9/1965 | Telkes et al. | 47/19.1 |
| 3,303,851 A * | 2/1967 | Grunfeld | 135/155 |
| 3,812,616 A * | 5/1974 | Koziol | 52/63 |

(Continued)

FOREIGN PATENT DOCUMENTS

AU  2003100111 A  *  2/2003  ............ A01G 9/20

(Continued)

*Primary Examiner*—Peter M. Poon
*Assistant Examiner*—Andrea M. Velenti
(74) *Attorney, Agent, or Firm*—William B. Noll

(57) ABSTRACT

A system and kit of components for winterizing plants and trees, where the invention comprises a skeletal frame formed by plural first tubular members, each having an upper end and a lower end. When assembled, the respective lower ends are spaced apart and positioned vertically and anchored within the ground surrounding the plant or tree. Joined between adjacent first tubular members are plural second tubular, horizontally oriented, members to form a generally square skeletal frame. About the skeletal frame is a light-transmitting plastic wrap. Overriding the skeletal frame is a top frame, preferably pivotal about a pair of upper ends, to allow access to the protected plant or tree. Additionally, the invention contemplates a cover, such as a plastic wrap or canvas-like material over the top frame to ensure complete protection of the plant or tree. Finally, and most significantly, the invention includes a hydro heat transfer system that extracts the inherent heat from the ground and the heated air within the skeletal frame to provide additional protection against sub-freezing temperatures.

16 Claims, 7 Drawing Sheets

U.S. PATENT DOCUMENTS

| | | | |
|---|---|---|---|
| 4,099,344 A * | 7/1978 | Ruemeli | 47/19.1 |
| 4,137,667 A | 2/1979 | Wallace et al. | |
| 4,285,163 A * | 8/1981 | Booker, Jr. | 47/45 |
| 4,614,055 A | 9/1986 | Day | |
| 4,651,465 A | 3/1987 | Lilly | |
| 4,785,576 A * | 11/1988 | Morgan | 47/29.1 |
| 4,922,653 A * | 5/1990 | Stone | 47/45 |
| 4,986,025 A * | 1/1991 | Imperial | 47/2 |
| 5,361,535 A * | 11/1994 | Morasiewicz | 47/30 |
| 5,509,229 A | 4/1996 | Thomasson et al. | |
| 5,862,625 A * | 1/1999 | Parker | 47/47 |
| 6,088,953 A | 7/2000 | Morgan | |
| 6,385,900 B1 * | 5/2002 | George | 47/40.5 |
| 6,618,988 B2 * | 9/2003 | Williams et al. | 47/17 |

FOREIGN PATENT DOCUMENTS

| | | | | |
|---|---|---|---|---|
| GB | 1552188 | * | 9/1979 | A01G 13/04 |
| GB | 2174281 A | * | 11/1986 | A01G 13/04 |

* cited by examiner

Fig. 5
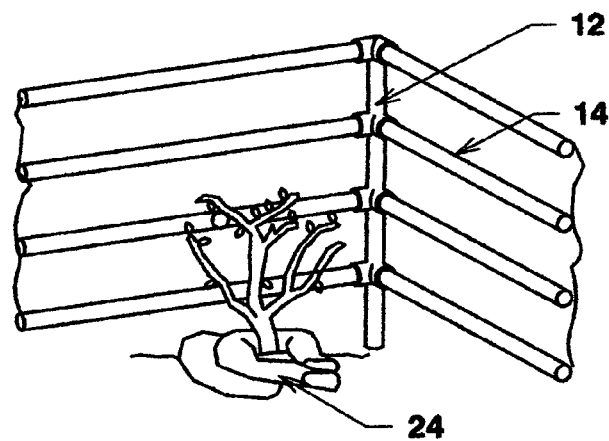
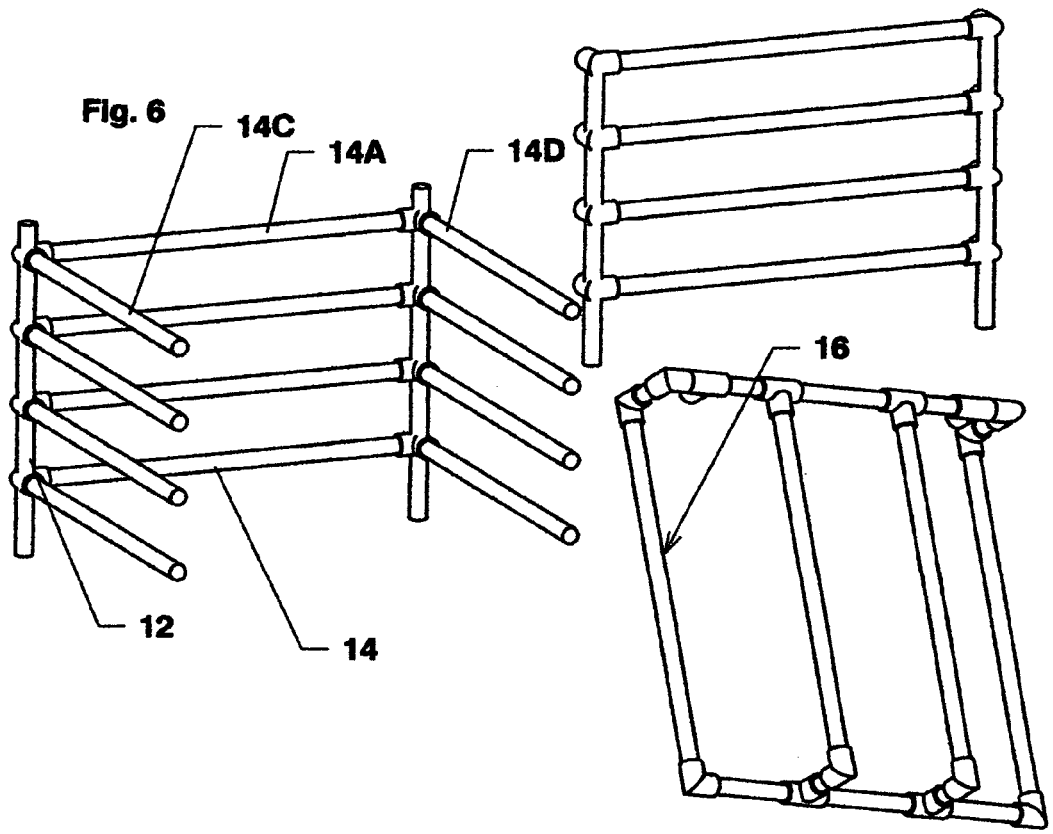
Fig. 6

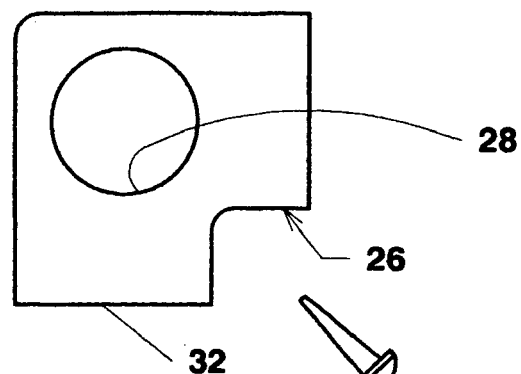
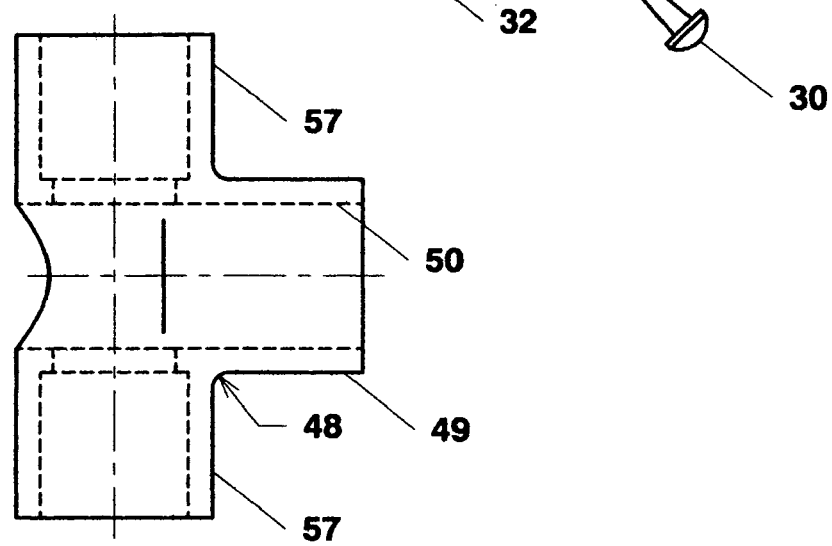
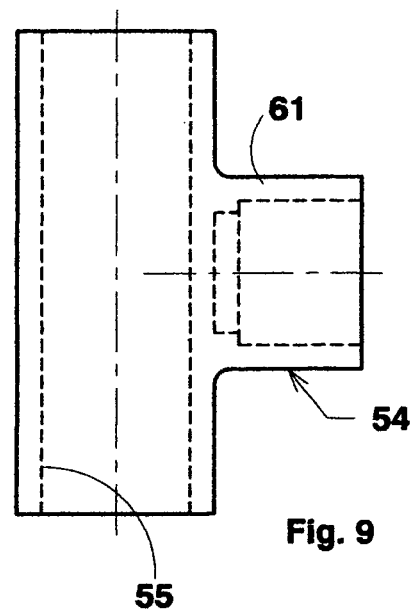

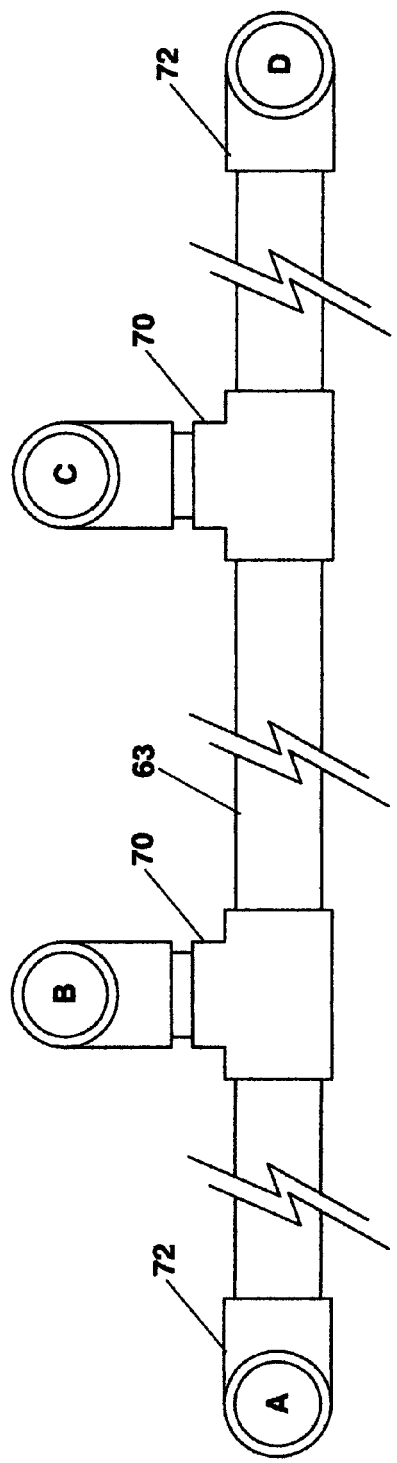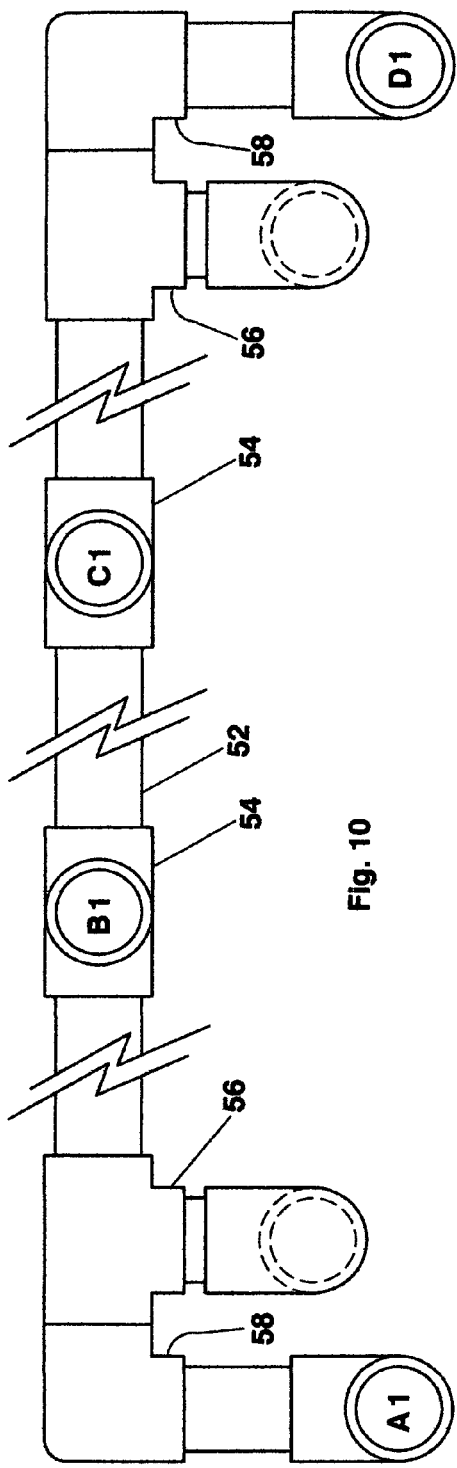

SYSTEM AND KIT OF COMPONENTS FOR WINTERIZING TREES

RELATED INVENTION

This application is related to and claims priority of Provisional Application, Ser. No. 60/469,218, filed May 12, 2003, by the inventor hereof, under the same title, where the contents thereof are incorporated herein in their entirety by reference.

FIELD OF THE INVENTION

This invention is directed to the field of providing winterizing protection to plants and trees, such as an orange tree, more particularly to a low cost, portable system and kit of components that includes a hydro heat transfer subsystem in the form of a tree spiral surrounding shield of at least one water tube to provide further protection during sub-freezing temperatures.

BACKGROUND OF THE INVENTION

The present invention relates to a system to protect plants and trees, especially fruit trees, such as orange trees, with a goal hereof to expand the growing areas to those subject to freezing temperatures. Typically, orange groves, at least in the southeastern states of the U.S., have been restricted to the midstate regions of Florida, where freezing temperatures are seldom encountered. Northern Florida, and neighboring states, too often experience occasional freezing temperatures for sufficient times that may severely damage or destroy orange trees, particularly at the early stages in the growing process.

Freeze damage to trunked plants, especially orange trees, is a problem for which a multitude of solutions have been proposed over the years. For example, it has been proposed to cover the trees with tents, canvas, for instance, to protect them from the freezing cold. This practice has proven to be generally impractical. It has also been proposed to use wind machines to stir up the air and mix the lower stratified cold air with warmer air at higher levels. This method is very expensive and has had mixed results. Another practice proposed is to heat the groves of orange trees to avoid frost damage. Heating has most often been done by the use of smudge pots which form a heavy screen of dense black smoke to protect the trees. However, smudge pots are expensive to operate, ecologically offensive and often ineffective, especially in the presence of even mild winds. Attempts have also been made to protect the trees by spraying heated or unheated water on the trees during periods of low temperatures, another method proven to be highly ineffective.

The prior art, as generally reviewed above, has long recognized the need for protecting orange trees, particularly new and young plants and trees, in certain cold environments. Certain solutions for protecting individual plants and trees, in the form of heat conducting devices and covering enclosures, for such needs, are reflected in the following U.S. Patents:

a.) U.S. Pat. No. 2,014,175, to Hart, discloses a flexible covering system including a pair of crossing U-shaped members, the free ends of which are anchored in the ground about the plant, an encircling ring holding the U-shaped members together, and a flexible cover positioned over the assembly to provide protection to the plant.

b.) U.S. Pat. No. 4,614,055, to Day, teaches a system for servicing trunked plants, such as citrus trees, in which water, in heated or unheated form is delivered by a manifold system to the base of each tree, conducted upwardly in a hose helically upwardly encircling the tree to a collar encircling the tree at an intermediate location on the trunk. The water is discharged from a plurality of circumferentially spaced openings in the collar and allowed to flow by gravity back down the trunk. In unheated form, the water irrigates and nourishes the tree trunk. In heated form, the water warms the tree trunk and protects the tree trunk from frost damage. The heated tree trunk and heated water will also heat the air next to the tree trunk. This heated air will rise upward and outward to heat some major branches and foliage beyond the tree trunk area.

c.) U.S. Pat. No. 4,651,465, to Lilly, is directed to a device for protecting plants, especially citrus trees, from damage resulting from freezing temperatures. A heat conducting device, which derives its heat from circulating water, is placed adjacent a tree trunk. The heat conducting device and the tree trunk are placed within a thermal barrier and the top of the thermal barrier is sealed around the tree trunk to define an air space thereabout. Water is circulated through the heat conducting device and heat is supplied to the air space. Water leaving the heat conducting device may be poured onto the ground or sprayed over the tree to provide additional protection to the plants during a freeze.

d.) U.S. Pat. No. 5,509,229, to Thomasson et al., relates to a self-supporting thermally-protective plant enclosure that includes a plurality of elongated hollow closure bodies each having a pair of outer and inner transparent walls. The outer and inner wall are each peripherally interconnected by a base, a top and a pair of opposite sides extending upwardly from the base to the top. Each closure body is closed along the opposite sides and base and is open at least through a portion of the top, defining an internal cavity in the closure body capable of receiving and holding a quantity of fluid therein. The closure bodies are positioned in side-by-side relation and are coupled one closure body to the next along the opposite sides thereof so as to form the plant enclosure with an open top and bottom, and an annular configuration surrounding a protective plant growth chamber. The plant enclosure also includes features for releasably coupling the closure bodies together along adjacent pairs of opposite sides of closure bodies so as to permit opening and closing of the plant enclosure at the opposite sides of the closure bodies of the plant enclosure.

e.) U.S. Pat. No. 6,088,953, to Morgan, discloses a collapsible protective plant cover comprising a pair of vertically spaced and coaxial support rings of spring steel. A tubular wall made of highly flexible sheeting is connected between the rings for protection from weather and animals. The tubular wall is sized for surrounding a plant with sufficient spacing therefrom. The top ring is spanned by a flexible top sheet. A small handle is attached across a small central hole on the top sheet. A stake is inserted into the ground near the center of the plant. The handle is supported on a hook positioned above the plant on the stake. The cover is entirely supported by the stake. The cover is easily removed from the plant and collapsed by twisting and coiling the rings on themselves.

The foregoing prior art recognize two approaches to providing winterizing protection to plants and trees, specifically in the form of an enclosure, or in intimate flowing water, but none offer an economic solution with a system that effectively protects such plants and trees during freezing spells. The manner by which the present invention achieves the goals of the invention will become clearer in the description which follows.

SUMMARY OF THE INVENTION

This invention relates to an economical system, and to a kit of components, for winterizing young plants and trees by a combination of an enclosure and a hydro transfer subsystem in the form of flexible water tube(s). The system of the invention comprises a plurality of vertically oriented stakes, preferably tubular PVC piping, containing plural brackets or joints for slidably receiving comparable PVC, laterally oriented, piping to join adjacent said stakes, where the assembly of PVC pipings define a skeletal form for surrounding the young plant or tree. A preferred shape for the skeletal form is square, but other shapes are likewise suitable so long as to surround and be spaced from the young plant or tree. For stabilizing said skeletal form, and to provide protection to the contained young plant or tree, a wrap of plastic, preferably a clear plastic shrink wrap having "clinging" characteristics, as known in the art, is positioned about the skeletal form. In a preferred embodiment, a pivotal cover, similarly covered by a wrap of plastic, or by a canvas-like material, may be provided to allow the user thereof to completely cover the system during those harsh periods of cold weather, while freeing the user to remove the cover when temperatures rise. Finally, the system also includes a hydro heat transfer subsystem in the form of one or more flexible water containing tubes, such as plastic, to be wrapped around and positioned on the ground about the plant or tree truck. By the use of a flexible plastic tube containing water, the tube hugs and conforms to the ground contour to thereby pickup heat from the ground through a heat transfer. Additionally, the sun heats the water tubes, as well as the air within the skeletal enclosure, to add further heat energy to the system. That is, this hydro heat transfer subsystem protect the delicate plant or tree during the freezing temperatures. The system may be readily and economically packaged to give the user a low cost means to protect and winterize a new tree, such as an orange tree, in regions heretofore not conducive to raising an orange tree.

Accordingly, a feature of this invention is the provision of an economical system to provide winterizing protection to new plants and trees, such as citrus trees, in regions not normally conducive to such plants or trees.

Another feature of the invention hereof is a convenient kit of components to provide an effective, low cost means to protect young plants and trees during winter weather.

Still a further feature of the invention is a system that includes a plurality of PVC type, interfitting members, to form a skeletal frame, a plastic wrap to surround and stabilize said frame, and at least one flexible water tube, preferably containaing about 15 gallons of water, capable of conforming the ground contour for extracting heat from the ground and from the heated air if the enclosure, to thus transfer the heat to the plant or tree.

An additional feature hereof is the provision of a removable cover to allow the user to selectively open and close the system as temperatures change from below freezing to above freezing, then back to below freezing.

These and other features of the invention will become more apparent from the description which follows, particularly when read in conjunction with the accompanying drawings.

BRIEF DESCRIPTION OF DRAWINGS

FIG. 5 is a partial perspective view, as viewed from the top of the system hereof, showing an orange tree and the water filled plastic tube(s) spirally positioned about the tree trunk.

FIG. 6 is a perspective view showing the separated and partially assembled components forming the skeletal frame for the system of this invention.

FIG. 7 is an enlarged top view of an L-shaped elbow bracket for joining the transverse or horizontal members of the skeletal frame to the plural vertical frame members hereof, including a securing fastener element.

FIG. 8 is an enlarged top view of a preferred bracket, with parts shown in phantom, for receiving a pair of aligned transverse or horizontal members to construct a larger or doubled sized skeletal frame for mature trees.

FIG. 9 is an enlarged top view of a pivotal T-bracket for use in the construction of the pivotal cover member.

FIGS. 10 and 11 are enlarged views of a preferred system for the pivotal arrangement of the top fame, where FIG. 10 is the cross end member at the pivoting end, and FIG. 11 is the cross end member remote from the cross end member of FIG. 10, where the two cross end members cooperate with plural transverse tubular members to form a generally rectangular top frame.

DETAILED DESCRIPTION OF PREFERRED EMBODIMENT

Figure 1:
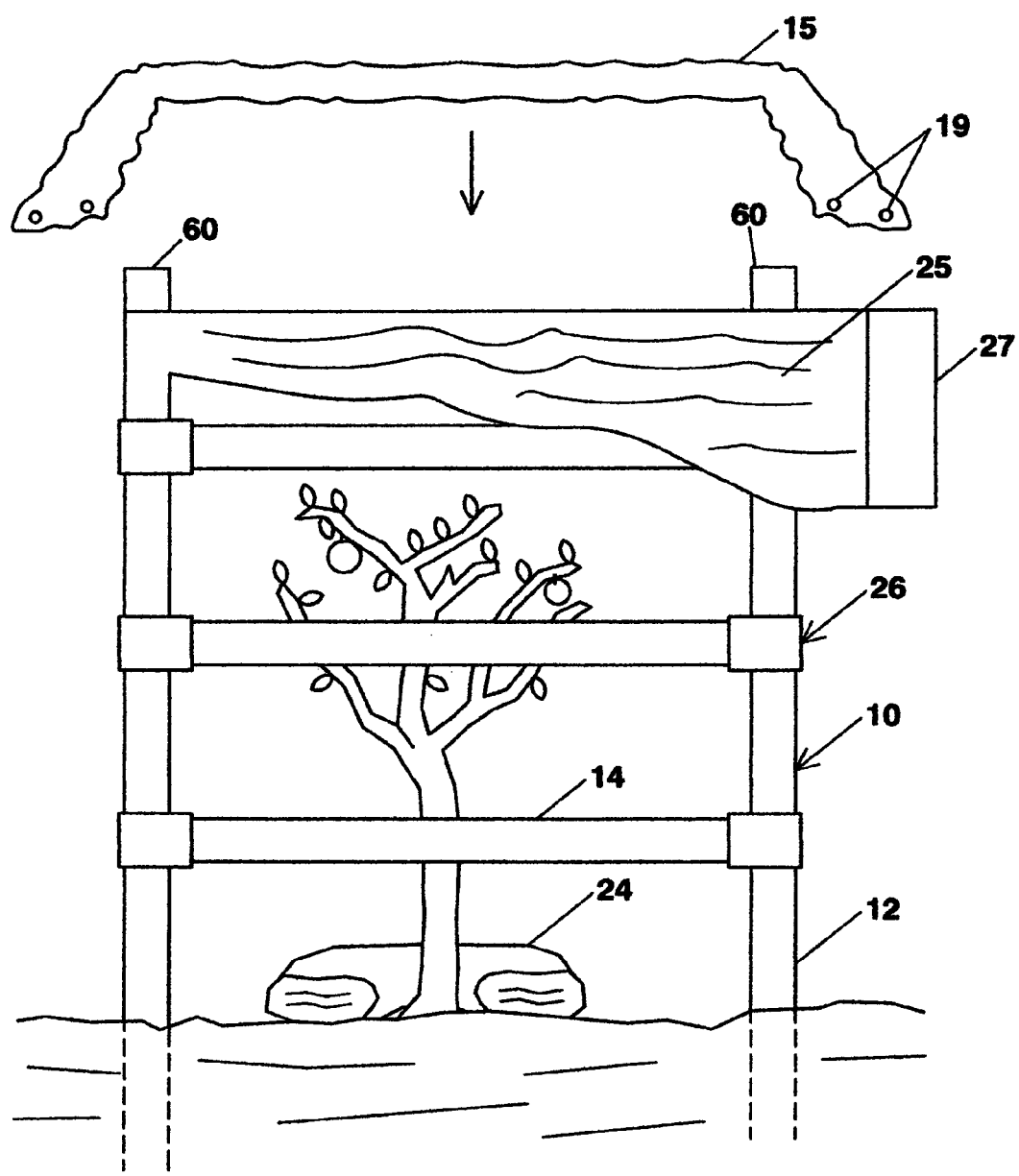
FIG. 1 is an exploded front view, with parts removed for clarity and understanding, illustrating the tree and plant winterizing system according to this invention, where the system is shown without a visible cover member.

The present invention is directed to a system for winterizing plants and trees, especially orange trees, against harsh winter weather, and a kit of components that allows even an inexperienced user to assemble the system. The system hereof comprises a skeletal frame to surround the tree or plant, a roll of plastic shrink wrap that goes around the skeletal frame, and a hydro heat transfer subsystem, particularly in the form of one or more water filled, flexible plastic tubes to surround the tree trunk to extract heat from the ground and heated air, and transfer same to the protected tree trunk. The invention will now be described with regard to the accompanying drawings, where like reference numerals represent like components or features throughout the several views.

Turning first to FIGS. 1, 2, 2A and 3, the system of this invention comprises a skeletal frame 10 formed by plural, vertically oriented, ground penetrating members 12, such as polyvinyl chloride plastic (PVC), and plural horizontal members 14, such as PVC, extending therebetween, where the respective components are joined together by elbow type brackets, as later discussed. While the preferred shape for the skeletal frame is a square with four corner members, a circular shape may be used. However, since the square shape is the preferred form, the further description will be limited to the square shape. Further, such a shape lends itself to the pivotal cover member 16.

Figure 2:
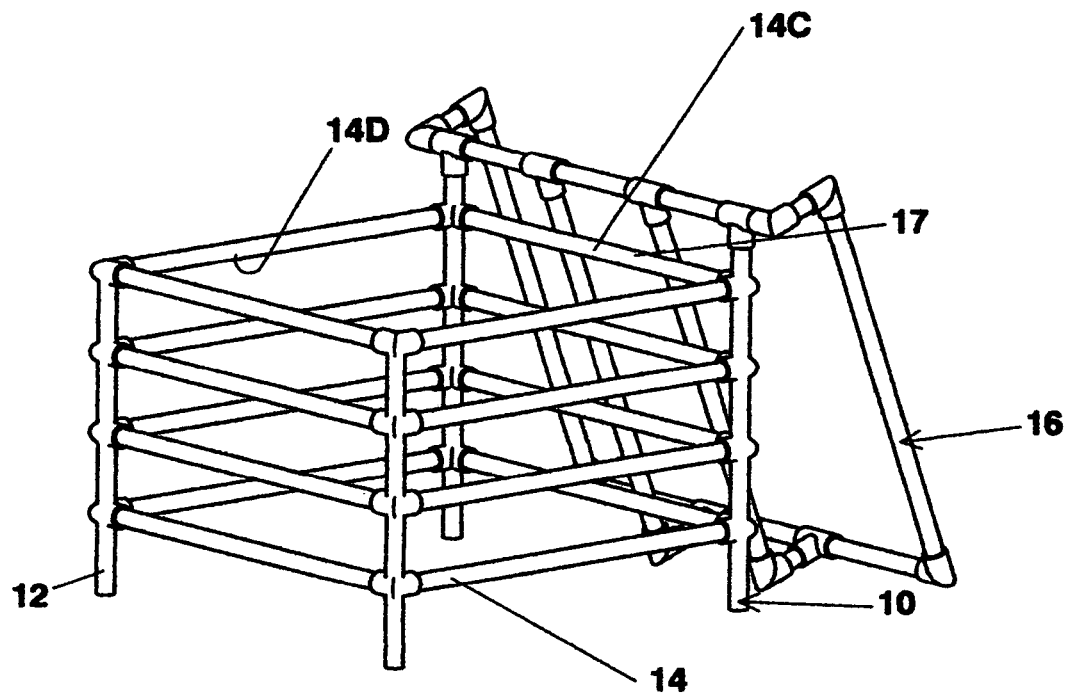
FIG. 2 is a perspective view of the skeletal fame, without the outer plastic wrap, showing the system of this invention, with a pivotal top member in the fully opened position.
Figure 2A:
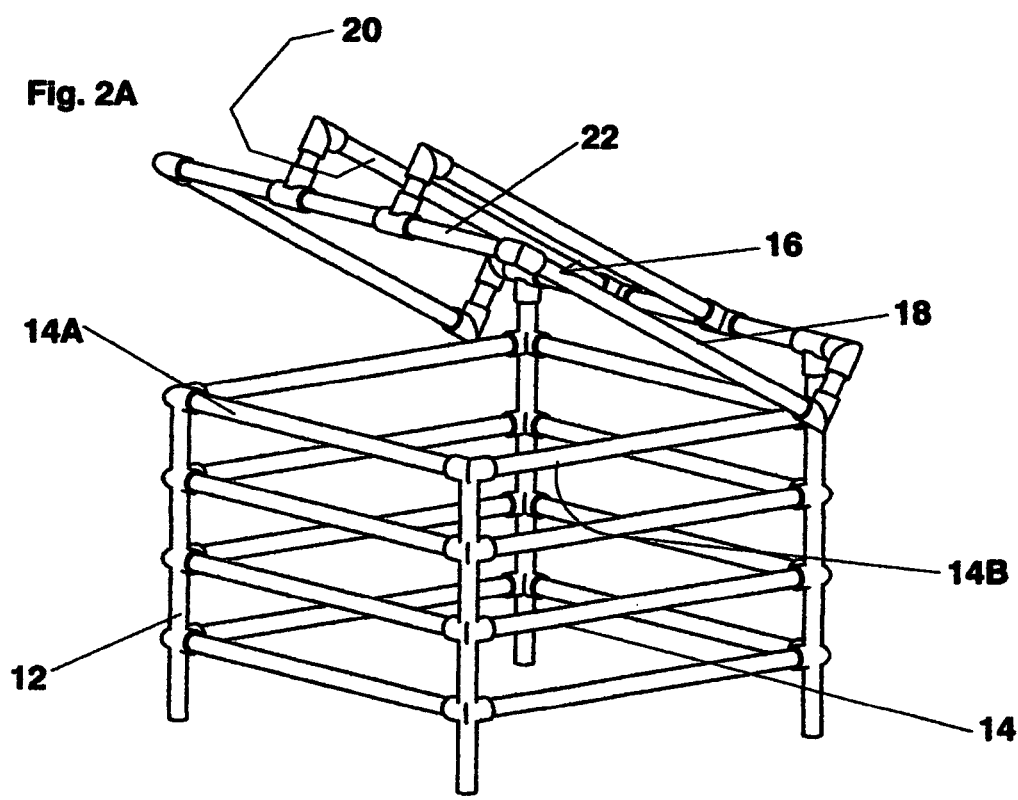
FIG. 2A is a perspective similar to FIG. 1, showing the pivotal top in a partially opened position.
Figure 3:
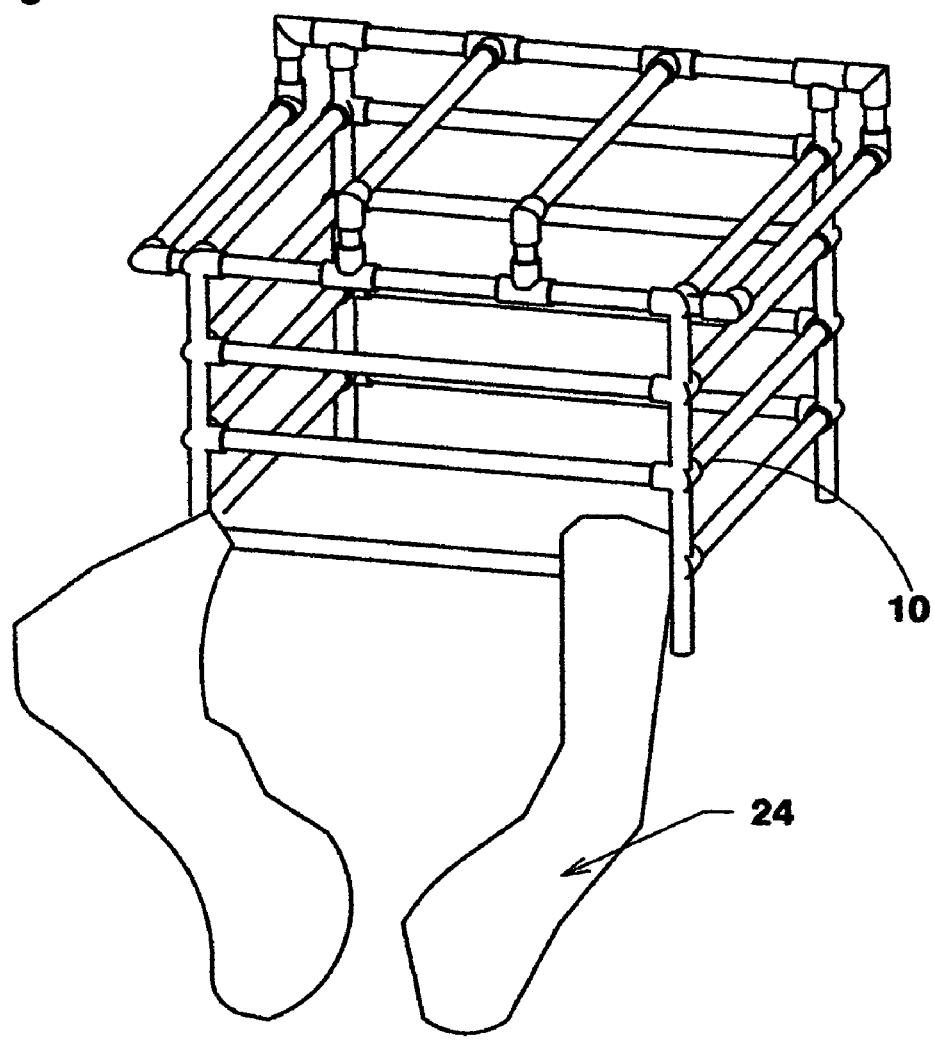
FIG. 3 is a perspective view of the system of FIGS. 1, 2 and 2A, showing the pivotal top in a fully closed position, and further illustrating the hydro heat transfer subsystem in the form of a pair of elongated water tubes, conveniently secured at one end to the vertical frame members, for use in positioning about the tree or plant truck to be protected.
Figure 4:
FIG. 4 is a top view from within the skeletal frame showing an orange tree trunk and the surrounding water tube about said tree trunk.

The pivotal cover member 16, preferably L-shaped, is formed by outer tubular members 18 and plural inner tubular members 20 having an L-shaped end 22 so as to override and extend downwardly over the top horizontal member 14A, see FIG. 3. The opposite edge of the cover member 16 may be provided with a pair of T-shaped, pivotally movable brackets (see FIGS. 10 and 11) cooperating with the horizontal member 14B to allow for an easy manually movable cover member 16, see FIG. 2. Further, as best seen in FIGS. 1 and 2, the upper horizontal members 14A, 14C and 14D may be provided with an elastomeric or plastic sleeve 17 to contact and help seal the overlying cover member 16 to thereby provide an effective and protective enclosure against a harsh weather environment. Though the cover frame may be wrapped as discussed above, an effective cover may be a canvas-like, square shaped material 15, or tarpaulin, as known in the art, that is larger than the square shape of the skeletal frame so as to overlap the sides thereof. The canvas-like material may be easily secured about the skeletal frame by tying same by means of eyelets 19. Even when tied down, the cover member 16 can be quickly pivoted to expose the protected plant or tree to the sun, rain and bees during the warmer daylight hours.

The system of this invention incorporates a hydro heat transfer subsystem in the form of one or more elongated, flexible containers or plastic tubes 24 to be filled with water and positioned in proximity to or about the trunk of the plant or tree to be protected, whereby the flexible nature of the water containing tube readily conforms to the ground contour. This intimate contact with the ground extracts the inherent heat from the ground to ensure the heat providing protection of the hydro heat transfer subsystem. That is, the hydro heat transfer subsystem collects heat from the sun and the ground, where the ground is heated from the sun and the core of the earth. The water in the plastic tubes holds the heat very well, and releases it slowly during the evening hours, the time for the coldest temperatures. A typical plastic bag may be about 10 inches wide (20 inches in circumference filled) and about seventeen feet long, having a capacity of about fifteen gallons of water. FIG. 3 shows a typical flexible tube 24, preferably formed of a relatively heavy gauge plastic sheet, whereas FIGS. 1 and 5 show the tube 24 water filled and positioned about the tree trunk.

As best seen in FIG. 1, the skeletal frame 10 is surrounded by a clear or translucent, or light-transmitting plastic film wrap 25, to ensure passing of sunlight therethrough, where a preferred commercial product is a plastic shrink wrap, as known in the art. The enclosure or wrap cooperates with the hydro heat transfer subsystem by providing a tight and continuous shield against the wind to reduce heat loss from around the tree or plant. FIG. 1 illustrates a preferred manner of applying the plastic wrap, namely a continuous roll 27 that is fed off the roll wrapped and overlapped about the skeletal frame. By tautly surrounding the skeletal frame with the plastic shrink wrap, additional stability is provided to said frame.

FIG. 6 shows the several components, partially assembled, that illustrates the easy manner of packaging said components into a kit of components. As noted above, the frame forming components include a plurality of vertically oriented, ground penetrating members 12, on the order of about five feet in length, with plural elbow brackets 26 (see FIG. 7). The elbow or L-shaped brackets 26 of FIG. 7 have been modified by the inclusion of a central opening 28 of a size to slidably engage a respective vertical member 12. The bracket may be positioned as desired and glued by means known in the art for PVC piping, along with the additional use of a stainless type fastener 30 passing through the elbow joint into the vertical member 12. The two ends of the bracket are characterized by openings 32 for sliding engagement with a respective end of a horizontal member 14. In the left of FIG. 6, twelve of such horizontal members 14 being shown, where the free ends of eight of them are positioned to be slidably joined to the second element shown in the middle of FIG. 6. All of these components may be partially assembled or unassembled for easy packaging into a kit of components. To complete the kit, a roll of shrink wrap and one or more water tubes or other flexible containers will be included.

FIGS. 8 through 11 illustrate preferred details of various aspects or components of the system according to the invention. FIG. 8 is a T-bracket for assembling an enlared or expanded skeletal frame, see FIG. 12. The T-bracket 48 includes a first leg 49 having a through bore 50 of a size to slidably receive an intermediate tubular member 51 (FIG. 12), and a pair of lateral legs 57 for receiving a complementary pair of transverse tubular members 59, again reference is made to FIG. 12. FIG. 9 is a second T-bracket 54 that features a through bore 55 for sliding and pivotal engagement with the cross member 52, see FIG. 10, and a second leg 61, perpendicular thereto, for receiving an internal support member 20.

FIGS. 10 and 11 are plan views of the pivoting end and remote end, respectively, of the pivotal cover member 16. FIG. 10 shows the transverse tubular member 52 mounting the pivoting T-brackets 54, a pair of end brackets 58 featuring an L-shaped extension for securing same to the upper end 60 of the skeletal frame 10 (FIG. 1). Additionally, the tubular member mounts a pair of brackets 56 for receiving cross support tubular members 20. The opposite or remote end (FIG. 11) of the cover member 16 includes a cross tubular member 63 mounting a pair of brackets 70 for receiving the cross support tubular members 20, and a pair of end brackets 72 for receiving the outer support tubular members 18. The reason for the off-set relationship of the cover member 16 is to provide for a wrap around of the cover, relative to the skeletal frame, to ensure a full covering thereto. The respective end members cooperate with plural transverse tubular members, illustrated in FIGS. 2 and 2A, where said tubular members extend between the respective brackets, namely A to A', B to B', C to C', and D to D', see FIGS. 10 and 11.

Figure 12:
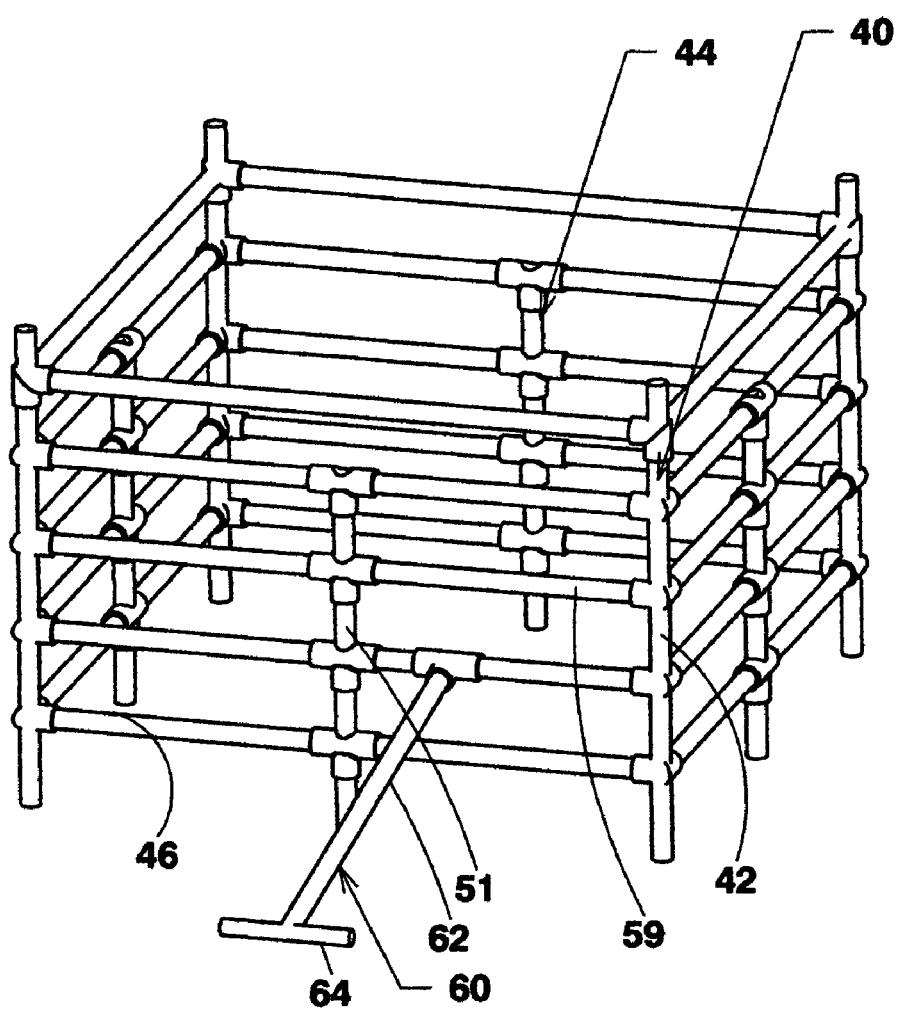
FIG. 12 is a front/perspective view of an alternate skeletal frame, specifically constructed for mature trees, showing an intermediate vertical tubular member between a pair of tubular corner members, where the skeletal frame is shown without a cover member.

Additionally, FIG. 12 shows a modified skeletal frame 40 that has particular utility for mature trees, for example. Obviously trees grow and mature, but protection may still be critical for the tree, especially an orange tree. In this modified version, four vertical tubular members 42 define the corners of the skeletal frame 40, while further stability is provided by four intermediate vertical tubular members 44, spaced and planarly aligned between a pair of corner members 42. To connect the plural horizontal or transverse tubular members 46, a T-bracket 48, of the type illustrated in FIG. 9 may be used. Specifically, T-bracket 48 is used to connect a pair of aligned, discrete members 46. The pivoting bracket 54, as illustrated in FIG. 8, and as discussed later is used with the pivotal cover member 16. Finally, FIG. 12 further shows one option for providing additional stability to the skeletal frame against high winds. The stability mechanism 60, applicable to both of the skeletal frames, comprises a first pivotal leg 62 terminating in a cross member 64 to be recessed within the ground. Though not shown, it is proposed that plural stability mechanisms will be used about the skeletal frame.

It is contemplated that changes, variations and modifications may be made to the system of this invention, such as a pulley mechanism to facilitate the moving or pivoting of the cover member, and to an anchoring mechanism that can be helpful in the event of high winds. This can be particularly helpful if snow accumulates on the cover. Accordingly, no limitation is intended to be imposed thereon except as set forth in the accompanying claims.

I claim:

1. A kit of components for winterizing plants and trees, where said plants and trees include in part a trunk, said kit comprising:
    a.) a skeletal frame formed by plural first tubular members, each having an upper end and a lower end, which when assembled form a generally rectangular frame about a said selected plant or tree, each said tubular member receiving plural, right angle, tubular receiving brackets, with a said bracket in proximity to said upper end, and plural second tubular members for extending between adjacent said first tubular members;
    b.) a clear plastic wrap to be secured about said skeletal fame;
    c.) a top frame pivotal from an opened position to a closed position about a pair of said upper ends;
    d.) a cover for securing to said top frame, said cover arranged to lie in part in direct contact with a portion of said clear plastic wrap,
    e.) at least one elongated flexible plastic tube for receiving a quantity of water, where the plastic tube is sized to be wrapped around said trunk of said plant or tree in direct contact with the ground about said trunk; and,
    f.) a pair of anchoring brackets to secure said skeletal frame to said ground against potentially high winds, said anchoring brackets being T-configured having a free end mounting a "T" bracket for pivotal movement about one of said second tubular member and a second end mounting an extended arm for anchoring said anchoring brackets in the ground.

2. The kit of components according to claim 1, wherein said clear plastic wrap is in the form of a continuous roll to allow wrapping and overlapping about said skeletal frame.

3. The kit of components according to claim 2, including at least a second said flexible plastic tube.

4. The kit of components according to claim 1, wherein said top frame is square and coextensive with said skeletal frame.

5. The kit of components according to claim 4, wherein said top frame comprises a pair of longitudinal members and a pair of transverse members to be joined to define said square shape, where one of said longitudinal members mounts a pair of pivoting brackets for mounting to a respective said upper end.

6. The kit of components according to claim 4, wherein said cover is a canvas-like material of a size greater than said skeletal frame.

7. The kit of components according to claim 1, wherein there are four said first tubular members, where each said first tubular member occupies a corner for said skeletal frame.

8. The kit of components according to claim 1, wherein there are eight said first tubular members, where four of said first tubular members occupy a corner for said skeletal frame, and four of said first tubular members each occupy a midposition between adjacent said corners.

9. A system for winterizing plants and trees against the harsh condition of sub-freezing temperatures, said plants and tees characterized in part by a trunk, said system comprising:
    a.) a skeletal frame for positioning about a selected said plant or tree and formed by
        (i) plural, spaced apart, first tubular members, each having an upper end and a lower end, where said lower ends are positioned within the ground surrounding said plant or tree, each said first tubular member receiving plural, tubular receiving brackets, with a said bracket in proximity to said upper end, and
        (ii) plural second, tubular members mounted in said brackets and extending between adjacent said tubular members to form said generally square skeletal frame;
    b.) a clear plastic wrap secured about said skeletal frame;
    c.) a top frame pivotal from an opened position to a closed position about a pair of said upper ends;
    d.) a cover for securing to said top frame; said cover overlaying said top frame and arranged to lie in part in direct contact with said clear plastic wrap, and,
    e.) a hydro heat transfer subsystem adapted to extract heat from said ground and heated air within said skeletal frame for transfer to said trunk, said hydo heat transfer subsystem formed of at least one elongated, flexible plastic tube filled with water and positioned in direct contact with said trunk and the ground.

10. The system according to claim 9, wherein said clear plastic wrap is formed by a continuous roll of a discrete width wrapped about said skeletal frame.

11. The system according to claim 9, including at least a pair of ground anchoring mechanisms to secure said skeletal frame against high winds.

12. The system according to claim 9, wherein said top frame is rectangular and coextensive with said skeletal frame.

13. The system according to claim 12, wherein said top frame comprises a pair of longitudinal members and a pair of transverse members joined together to define said rectangular shape, where one of said longitudinal members mounts a pair of pivoting brackets for mounting to a respective said upper end.

14. The system according to claim 9, wherein there are four said tubular members, where each said first tubular member occupies a corner for said skeletal frame.

15. The system according to claim 9, wherein there are eight said first tubular members, where four of said first tubular members occupy a corner for said skeletal frame, and four of said first tubular members each occupy a midposition between adjacent said corners.

16. The system according to claim 12, wherein said cover is a canvas-like material of a size greater than said skeletal frame.

* * * * *